US008292742B2

(12) United States Patent
Shelton

(10) Patent No.: US 8,292,742 B2
(45) Date of Patent: Oct. 23, 2012

(54) SYSTEMS AND METHODS FOR SIMULATION AND REGENERATION OF A VIRTUAL ENVIRONMENT

(75) Inventor: Brett Shelton, Providence, UT (US)

(73) Assignee: Utah State University, Logan, UT (US)

( * ) Notice: Subject to any disclaimer, the term of this patent is extended or adjusted under 35 U.S.C. 154(b) by 668 days.

(21) Appl. No.: 12/408,818

(22) Filed: Mar. 23, 2009

(65) Prior Publication Data
US 2010/0240459 A1    Sep. 23, 2010

(51) Int. Cl.
*A63F 9/24* (2006.01)
(52) U.S. Cl. .......................... 463/42; 463/40
(58) Field of Classification Search ............. 463/40, 463/42
See application file for complete search history.

(56) References Cited

U.S. PATENT DOCUMENTS
6,699,127 B1 * 3/2004 Lobb et al. .............. 463/43
* cited by examiner

*Primary Examiner* — N Drew Richards
*Assistant Examiner* — Yu-Hsi D Sun

(57) ABSTRACT

Disclosed are systems and methods for simulation and regeneration of a virtual environment. A simulation and regeneration system may record a simulation by reading out all information necessary to recreate the virtual environment to a simulation data file. In certain embodiments, the system may include an after action review mode. In the after action review mode, players may watch the recorded simulation in order to understand what happened during the simulation, why it happened, and what could be done to improve the result. A facilitator may provide feedback to the players during the after action review mode or during the simulation. A simulation may be regenerated based on data from the simulation data.

23 Claims, 7 Drawing Sheets

SYSTEMS AND METHODS FOR SIMULATION AND REGENERATION OF A VIRTUAL ENVIRONMENT

TECHNICAL FIELD

The present disclosure relates to systems and methods for simulation and regeneration of a virtual environment.

DETAILED DESCRIPTION OF PREFERRED EMBODIMENTS

Figure 1:
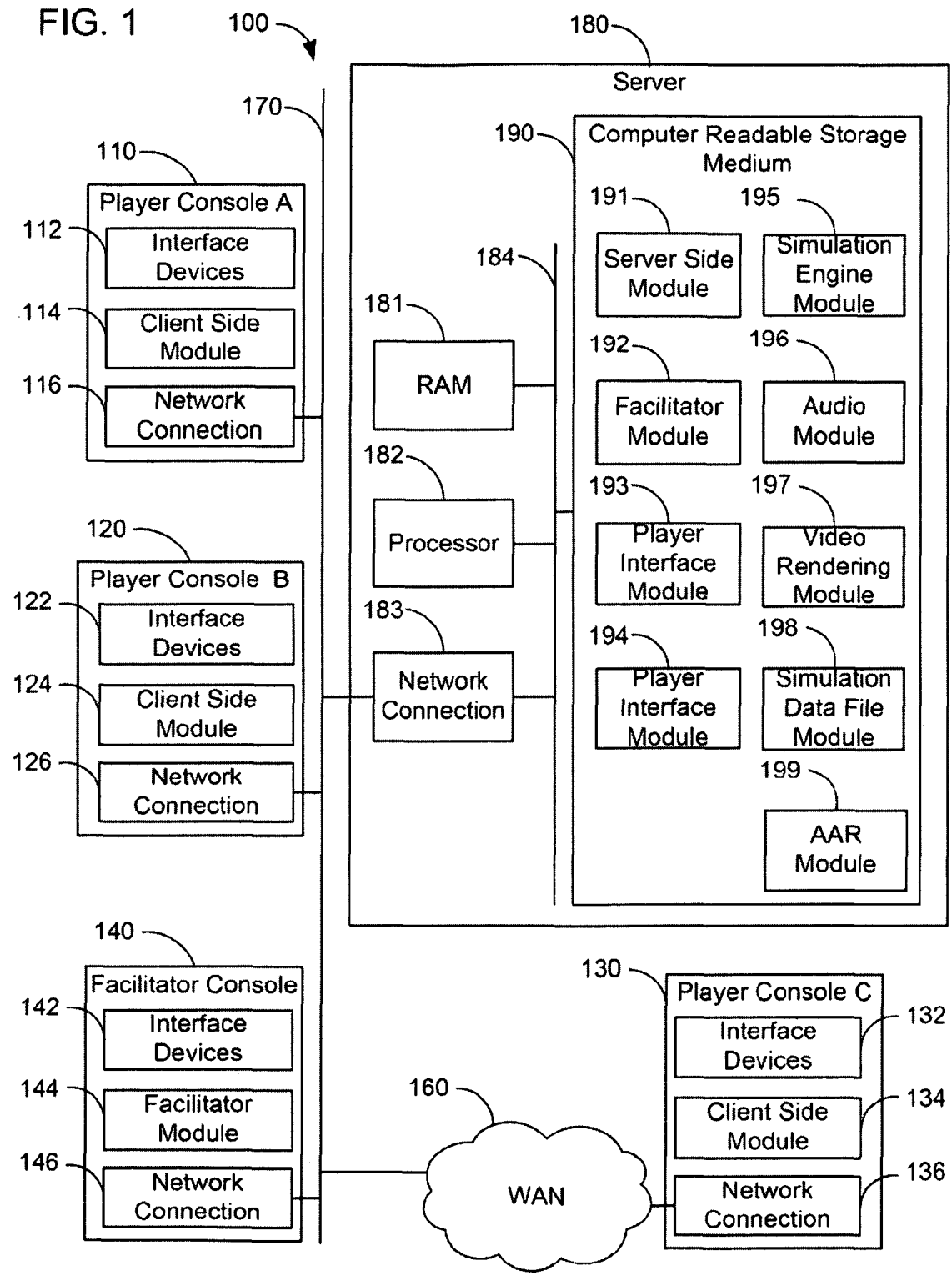
FIG. 1 is a flow chart illustrating one method for interaction of a plurality of clients with a server according to the present disclosure.

In the following description, numerous details are provided to give a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of this disclosure.

Embodiments of methods and systems for simulation and regeneration of a virtual environment are described herein. Virtual environments may be utilized to teach, train, and entertain groups of people. Some possible applications include training emergency response personnel, military personnel, healthcare providers, and other groups in a variety of situations. The players can practice coordinated action and communication protocols as part of a simulation, so as to develop and refine such skills. In the field of emergency response, for example, it would be beneficial to give emergency response personnel a dynamic way to train while being cost effective and safe at the same time. A virtual environment offers an advantageous way to fulfill the needs for this type of training. Further, the systems and methods disclosed herein may also be applicable to a wide variety of entertainment products, including video games and computer games.

A simulation and regeneration system may read out all information necessary to recreate the simulation to a simulation data file. Such information may include information about the players, information about the objects within the environment, the states of the certain functions within the environment, and the like. When a simulation is to be regenerated, data from the simulation data file may be read in to the simulation engine in order to regenerate the simulation.

At the end of the simulation, the players may review the simulation in an after action review (AAR) mode, or the players may regenerate the simulation at any point during the simulation. The AAR mode allows players to watch a simulation in order to understand what happened during the simulation, why it happened, and what could be done to improve the result. Using the data stored in the simulation data file, the simulation and regeneration system may allow players to review the entire simulation, or to selectively review portions of the simulation. Selective review of a simulation may be facilitated using various controls, such as a scrubber bar, fast forward, rewind, pause, and the like.

In the AAR mode, the players may watch the simulation from a variety of different views. Certain views may allow each player to see the actions of the other players. In certain embodiments, the simulation may comprise a virtual 3D environment, which may be reviewed from any viewpoint within that 3D space. An overview of an entire simulation showing the position of each player may be displayed. Different views may provide players with insight into how a simulation progressed, and how the outcome may be altered by making different choices.

In some embodiments, a facilitator may provide feedback to the players. The facilitator may flag points during the simulation for review in the AAR mode. The facilitator may also alter the virtual environment during the simulation. The facilitator may also set up the simulation, observe the simulation, and assist the players in reviewing the simulation.

After reviewing a simulation in the AAR mode, players may regenerate the simulation and implement the strategies identified for improving the result of the simulation. Players may experiment with the consequences of altering certain choices and create any number of simulations with different outcomes. Allowing players to regenerate a simulation enables the players to return to any point within the simulation in order to correct something that may have led to an undesirable outcome in the simulation.

The systems and methods disclosed herein may be utilized to provide uniform training programs and uniform assessment standards that can be utilized with different groups and at different times. A training and assessment simulation may allow an agency to assess its employees' performance under the same conditions, but at various points in time and in various locations. The systems and methods disclosed herein provide opportunities for teaching and training employees based on errors that the employees made during the simulation. At a given point in time, a simulation can be assessed, the players can be advised to make different decisions, and then the simulation can be regenerated so that the players can see how the different decisions lead to a different outcome of the simulation.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "connected to," and "in communication with" refer to any form of interaction between two or more entities, including mechanical, electrical, magnetic, and electromagnetic interaction. Two components may be connected to each other even though they are not in direct contact with each other and even though there may be intermediary devices between the two components.

Much of the infrastructure that can be used with embodiments disclosed herein is already available, such as: general purpose computers; computer programming tools and techniques; computer networks and networking technologies; wireless communication; and digital storage media.

Suitable networks for configuration and/or use as described herein include one or more local area networks, wide area networks, metropolitan area networks, and/or "Internet" or IP networks such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies. A network may incorporate land lines, wireless communication, and combinations thereof.

The network may include communications or networking software such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Each computer of a network may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer readable storage medium. The computer may also include various input devices and/or output devices. The input device(s) may include a keyboard, mouse, touch screen, light pen, tablet, microphone, sensor, or other hardware with accompanying firmware and/or software. The output device(s) may include a monitor or other display, printer, switch, signal line, or other hardware with accompanying firmware and/or software.

Aspects of certain embodiments described herein are illustrated as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKS, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Furthermore, the described features, operations, or characteristics may be combined in any suitable manner in one or more embodiments. It will also be readily understood that the order of the steps or actions of the methods described in connection with the embodiments disclosed herein may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

FIG. 1 illustrates a functional block diagram of a simulation and regeneration system according to the present disclosure. A plurality of player consoles 110, 120, 130 and a facilitator console 140 are connected by a network 170 to a server 180. As illustrated, player console A 110 and player console B 120 may be connected by a local area network (LAN), while player console C 130 may be connected by a wide area network (WAN) 160. The network 170 may carry data traffic between the player consoles 110, 120, 130, the facilitator console 140, and the server 180.

The player consoles 110, 120, 130 and the facilitator console 140 may be implemented in a variety of ways, such as computers, workstations, terminals, virtual machines, and the like. The plurality of player consoles 110, 120, 130 may each respectively include player interface devices 112, 122, 132, a client side module 114, 124, 134, and a network connection 116, 126, 136. The player interface devices 112, 122, 132 may allow a player to interact with a simulation via the respective player console. Such interaction may include providing input to the simulation system and receiving input from the simulation system. The client side module 114, 124, 134, may interact with a server side module 191 resident on the server 180. FIG. 1 illustrates a system with three player consoles 110, 120, 130 and a single facilitator console 140; however, it is contemplated that the system 100 may comprise any number of client and facilitator consoles. One of skill in the art will recognize that the present disclosure may be adapted to include more or fewer client and facilitator consoles than are illustrated in FIG. 1.

The server 180 may include RAM 181, a processor 182, a network connection 183, and a computer readable storage medium 190. The processor 182 may be embodied as a general purpose processor, an application specific processor, a microcontroller, a digital signal processor, or other device known in the art. The processor 182 performs logical and arithmetic operations based on program code stored within the computer readable storage medium 190. The computer readable storage medium 190 may comprise various modules for simulating and regenerating a virtual environment. Such modules may include a server side module 191, a player interface module 193, a player interface module 194, a simulation engine module 195, an audio module 196, a video rendering module 197, a simulation data file module 198, and an AAR module 199. Each module may perform a particular task associated with the simulation and regeneration of the virtual environment. One of skill in the art will recognize that certain embodiments may utilize more or fewer modules than are shown in FIG. 1. In certain embodiments, for example, additional modules may include texture modules, simulation specific modules, graphic modules, modules for interacting with specific player interface devices, and the like.

The server side module 191 may interface with the client side modules 114, 124, 134. The server side module 191 may handle communication with the client side modules 114, 124, 134. The server side module 191 may allow clients to join or exit the simulation. The server side module 191 may interpret or translate input received from the various consoles.

The facilitator module 192 may interact with the facilitator module 144 to load and regenerate simulations, to adjust conditions during a simulation, to flag events during a simulation for review in an AAR mode, and to control playback of a simulation during the AAR mode.

The player interface module 193 may process input from interface devices 112, 122, 132, 142. Interface devices 112, 122, 132, 142 may include a keyboard, a mouse, a joystick, a microphone, a motion sensing component, and the like. The input received from interface devices 112, 122, 132, 142, may be communicated to the simulation engine module 195, or other modules as appropriate.

The player interface module 194 may be responsible for generating the player interface displayed to each client. As discussed in greater detail below with regard to FIG. 5, the interface presented to the facilitator may differ from the interface presented to the other players.

The simulation engine module 195 is responsible for the rules of a simulation and for the interaction between the simulation and the players. For example, the simulation engine module may govern the physics of the virtual environment, may animate characters, may enforce certain rules, and the like. In a simulation for training firefighters, the simulation engine module 195, may govern how a fire spreads through a structure. Further, the actions of the players may govern how the simulation evolves. The simulation engine module 195 may generate an open ended simulation, such that an infinite number of possible alternatives may occur based on the rules of the simulation and the actions of the players. In an open ended simulation, there is no fixed outcome and no series of predetermined branches that force a particular outcome in a simulation. Accordingly, any one player's actions can drastically alter the outcome of the simulation. In some embodiments, the simulation engine module 195 may generate a three dimensional simulation environment. For example, in one simulation for training firefighters, the environment may be a home, where in another simulation, the environment may be an airplane. Accordingly, the firefighters may train for a variety of situations utilizing the same simulation system 100.

The simulation engine module 195 may coordinate the functions of various other modules and may receive input from the players and the facilitator in order to allow the players and the facilitators to interact with the simulation. For example, the simulation engine module 195 may pass updates to the audio module 196, the video rendering module 197, the player interface module 194, and the facilitator module 192. The process of feeding information into the simulation engine module 195 is further illustrated in connection with FIG. 2. Certain functionality implemented by the simulation engine module 195 may be available from products such as Ogre 3D and Ageia PhysX.

The audio module 196 may be responsible for allowing the players to communicate with each other and for generating audio signals related to the simulation. The audio module 196 may allow players to practice using communications protocols that are based on the real-world environment being simulated. The audio module 196 may generate appropriate audio signals related to the simulation. For example, the noises of a fire may be simulated in an appropriate simulation.

The video rendering module 197 may be responsible for generating data necessary to visually present the virtual environment to the players. The data regarding the state of the virtual environment may be received from the simulation engine module 195. The video rendering module 197 may send data to each console 110, 120, 130, 140, each of which may generate a unique visual representation of the virtual environment. The simulation engine module 195 may update the simulation at a particular rate (e.g. 60 times per second); however, in certain applications a higher refresh rate may be used to ensure that objects appear to move smoothly, and not in a blocky fashion. Each console 110, 120, 130, 140 may interpolate between the last rendering and the current state of the virtual environment so as to make objects appear to move smoothly. By utilizing interpolation, the consoles 110, 120, 130, 140 may allow an object to move in smaller increments while waiting for the next update, thus resulting in smoother motion. In another embodiments a unique visual representation of the virtual environment may be generated for each console 110, 120, 130, 140 by the video rendering module 197. In such an embodiment, the video rendering module 197 may also interpolate between the last rendering and the current state of the environment.

The simulation data file module 198 may be responsible for compiling all data necessary for regenerating a simulation. In one embodiment, the simulation data file module 198 receives input from the player interface module 193, the simulation engine module 195, and the audio module 196. All of the information is stored in a simulation data file, which may be saved and used to review and regenerate the simulation. The simulation data file module 198 may generate a simulation data file in any format that accommodates the types of data to be recorded. Recording player inputs to the simulation may reduce the size of a simulation data file when compared to storing a video representation of the simulation. Further, by storing the player inputs and states of the simulation, the simulation may be reviewed from different viewing angles and analyzed in other ways. For example, the entire simulation may be played from a first person view, but reviewed from a top down view to illustrate how the players interacted with each other during the course of the simulation.

The AAR module 199 may be responsible for controlling the review of a simulation in an AAR mode. The AAR module 199 may provide functionality for accessing data in a stored simulation data file and providing the data to the simulation engine module 195 in such a way that the stored simulation can be reviewed by the players. The AAR module 199 may allow the review of a simulation to be controlled using controls such as skip to the beginning or end of a simulation, fast forward, rewind, pause, stop, or a scrubber bar. The AAR module 199 may allow certain events to be flagged for review. The AAR module 199 may cause a stored simulation data file to be fed into the simulation engine module 195, as if the simulation was occurring in real-time.

In alternative embodiments, a peer-to-peer system may be employed instead of the server-client system shown in FIG. 1. In such embodiments, the various modules illustrated in connection with the server 180 may be executed on one or more peer computers.

Figure 2:
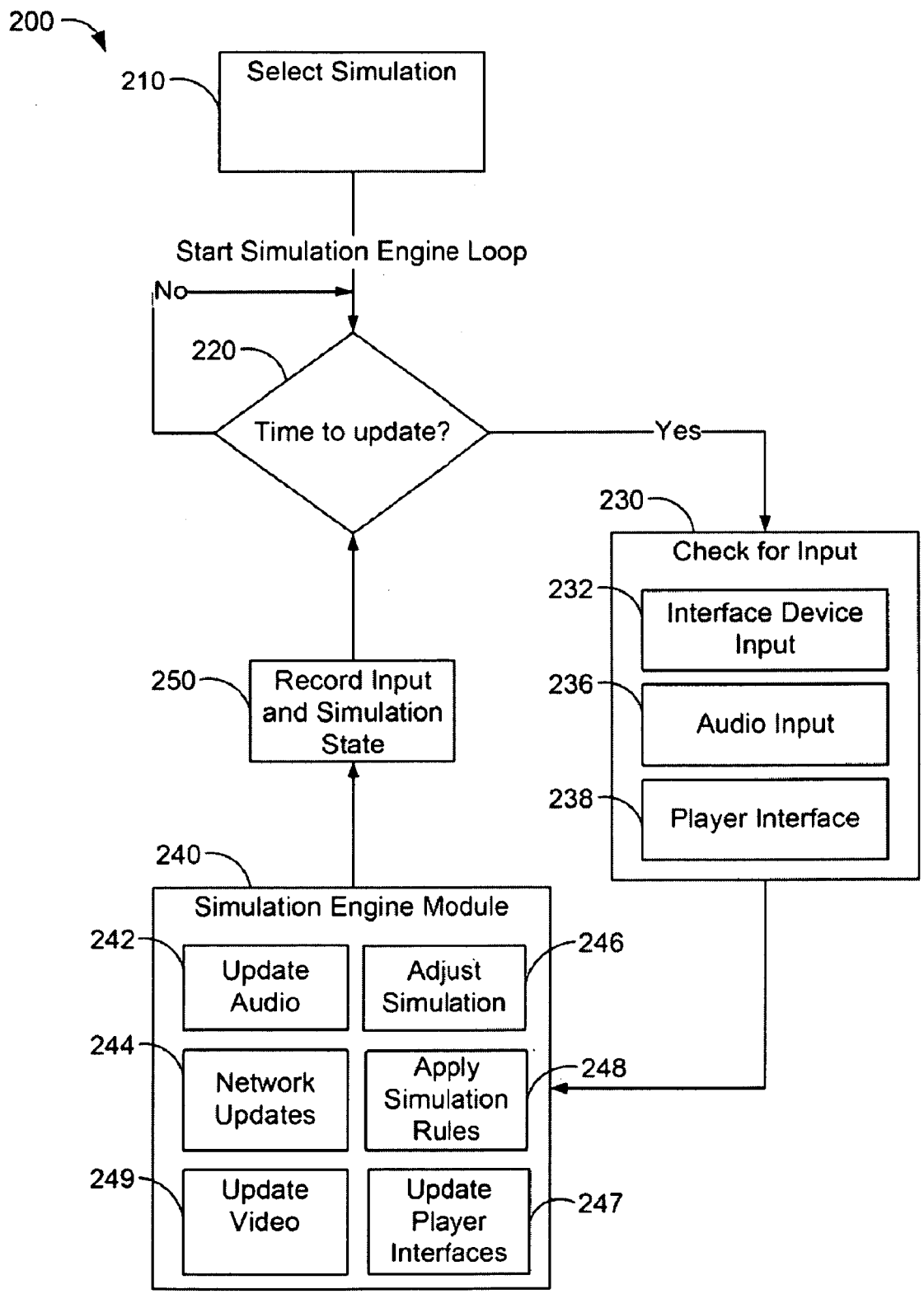
FIG. 2 is a flow chart illustrating one embodiment of a process for generating a simulation and recording the simulation.

FIG. 2 is a flow chart illustrating one embodiment of a process 200 for feeding input into a simulation engine module 240, generating a simulation by passing relevant information to other modules and receiving information from other modules, and recording the simulation. In step 210, a simulation is selected. After the selection 210, the simulation engine loop is initiated, and the process moves to step 220. At step 220, the process 200 awaits an appropriate time to update the simulation. In one embodiment, the simulation may be updated 60 times per second. When it is time to update, the process proceeds to step 230. At step 230 the system checks for input from the players and the facilitator. An input message may be received from any number of interface devices 232 (e.g. a mouse, a keyboard, a joystick), an audio input 236, or an input from the player interface 238.

After checking for inputs 230, any inputs received are fed into the simulation engine module 240, where the simulation is updated. The simulation engine module 240 may interface with an audio module to generate audio updates 242. For example, an audio input may have been received in step 230, and that audio update is transmitted to other players. In another example, an audio signal needs to be generated based on an event in the simulation, such as an explosion, or the sound of one object striking another. It may be determined in step 244 which updates need to be transmitted to each user via the network. Simulation rules 248 may be applied to the received inputs 230, or simulation rules 248 may be advanced in time. For example, an input 230 may correspond to taking action to extinguish a fire. The simulation rules 248 would be applied to the player action and adjust the simulation to extinguish the fire. In another example, where no input is received, a fire may be burning, and according to simulation rules 248 may expand at a set rate. The simulation may be adjusted 246 by the facilitator. In order to provide dynamic and challenging simulations, in certain embodiments, a facilitator may be empowered to alter the conditions of a simulation. The facilitator may have the capability of changing instances of objects or events during the simulation. The changing of instances includes adding, subtracting, or altering the way non-playing characters or events are implemented. For example, a facilitator may cause a fire to grow more quickly than would be the case if simulation rules governed the growth of the fire. The player interfaces may be updated 247. The simulation may then be rendered 249, such that the updated simulation is put into a form that may be displayed to the players. The updated simulation generated in step 240, together with any input received in step 230 is recorded at step 250 into a simulation data file. The process then returns to step 220.

Figure 3:
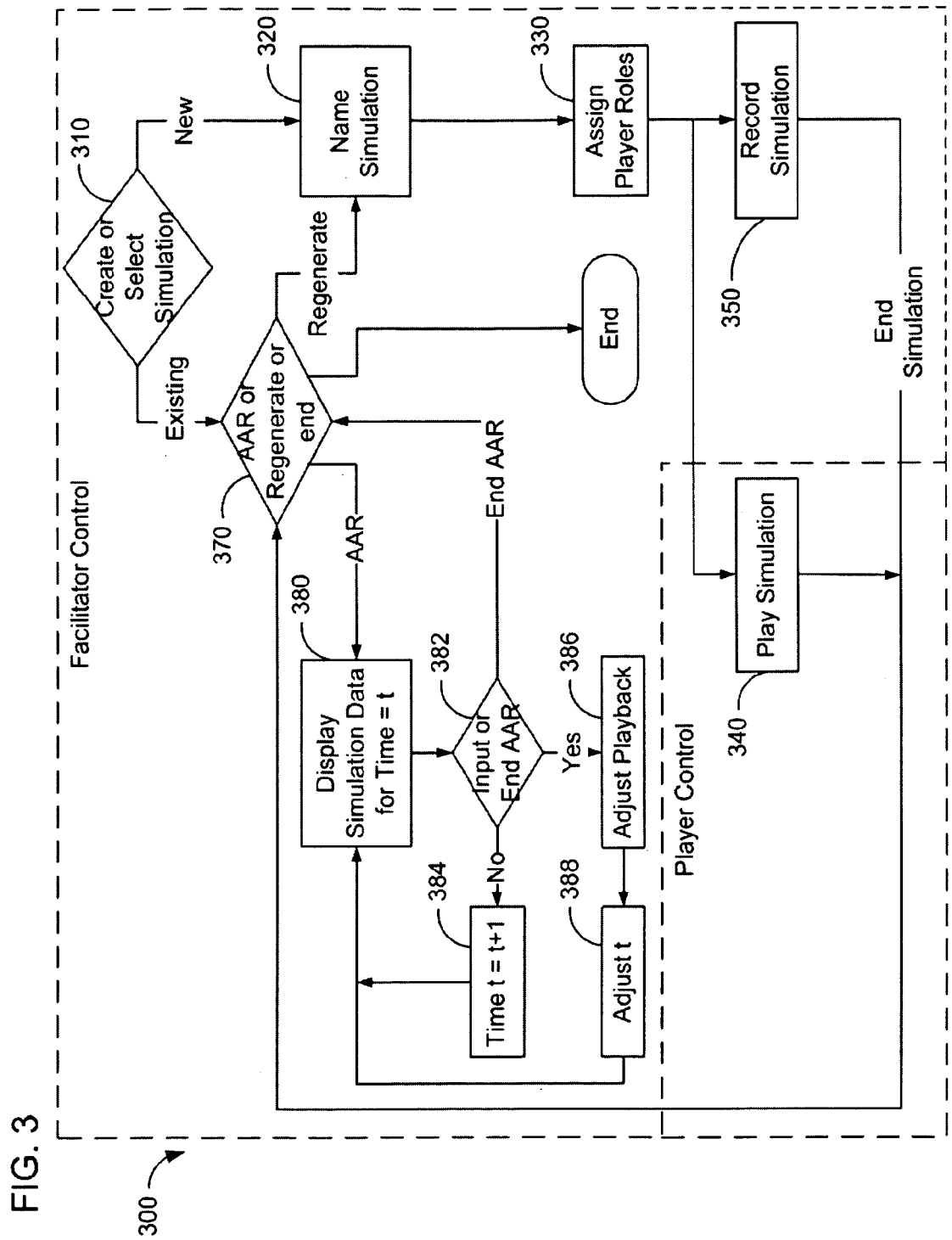
FIG. 3 is a flow chart illustrating one embodiment of a process for initiating a simulation, playing and recording the simulation, reviewing the simulations and regenerating the simulation.

FIG. 3 is a flow chart illustrating one embodiment of a process 300 for initiating a simulation, playing and recording the simulation, reviewing the simulation, and regenerating the simulation. At step 310, a new simulation is created or an existing simulation is selected. In the case where a new simulation is created, the facilitator gives a name to the simulation 320 and assigns roles to the players 330. For example, in one simulation involving an emergency response simulation, certain players may be assigned as emergency responders, while others are assigned as victims. In yet another simulation, one player may be assigned as a leader, while other players are assigned as members of a team.

At step 340 the simulation is played, and recorded 350, until the simulation ends. When the simulation ends, the process moves to step 370 where the facilitator may choose whether to enter an AAR mode or to regenerate the simulation. As indicated, in step 310 the facilitator may also open an existing simulation, and move to step 370. The players control the outcome of the simulation in step 340 by providing input to the simulation. The facilitator may cause the simulation to end and cause the process to return to step 370.

In the AAR mode, recorded data from a simulation is displayed. The AAR mode 380 may display data from the recorded simulation for a time (t). Initially, the time may be set to coincide with the beginning of the simulation, or at any other point. At step 382, the process determines whether the facilitator has entered an input (e.g. fast-forward, rewind, change of time, etc.) or whether the recorded data is at an end. If the data is at an end, or the facilitator chooses to exit the AAR, the process moves to step 370. If the input adjusts playback, the process moves to step 386. At step 388 the time is adjusted and the new time is fed back into the display step 380. If no input is received at step 382, the time is incremented and fed back into the display step 380.

At step 370 the facilitator may choose to end the process 300, or to regenerate the simulation. The regeneration of the simulation may be set to coincide with a particular time. For example, if an error is identified during in the AAR mode 380, the facilitator may regenerate the simulation at a time shortly before the error. In this way, the player that committed the error can learn from the mistake and correct the mistake, without requiring the players to replay the entire simulation. If the facilitator chooses to regenerate a simulation, the process returns to step 320, where a new simulation name is selected, so that the regenerated simulation can be distinguished from the original simulation. In certain embodiments, a player may also act as the facilitator.

Figure 4A:
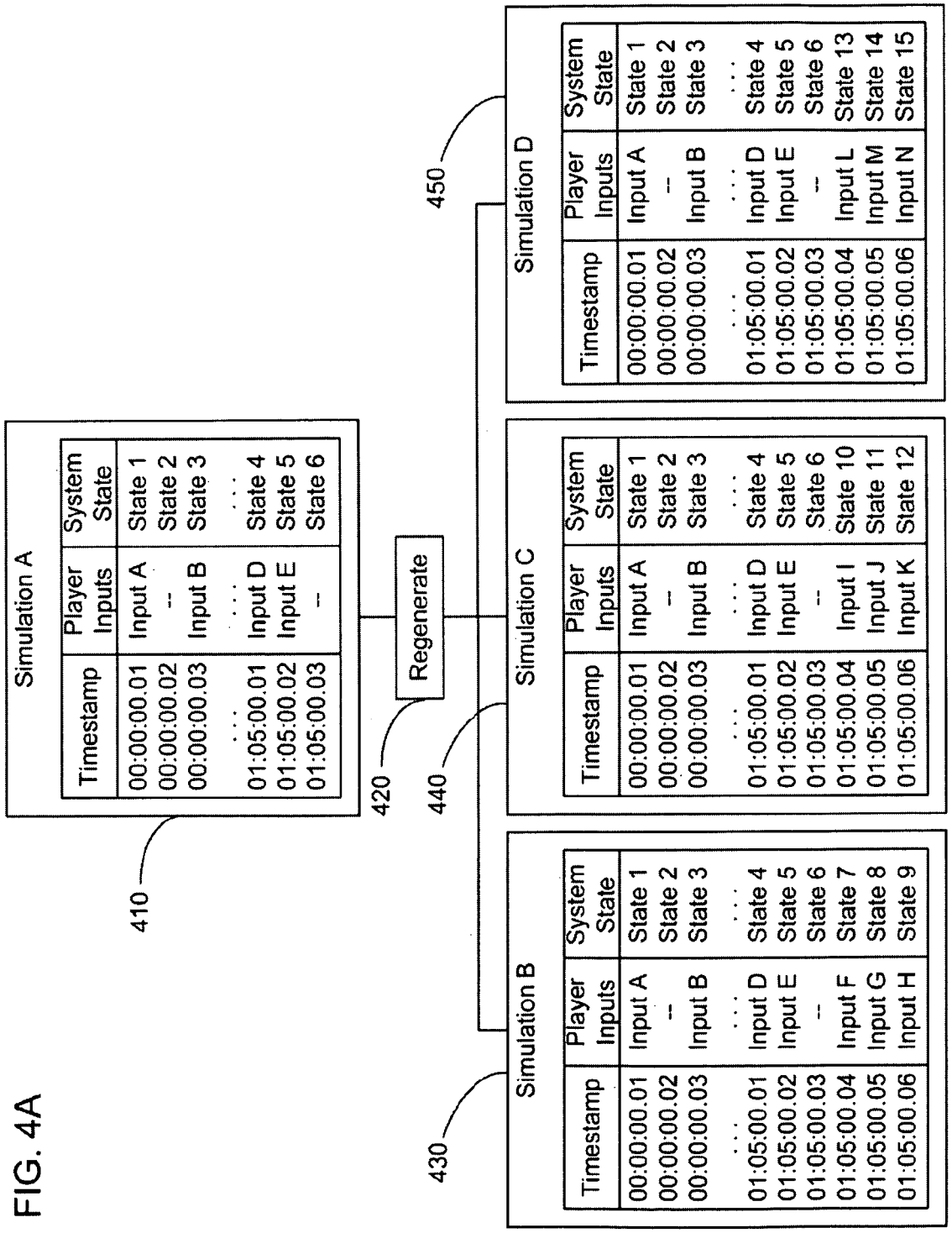
FIG. 4A illustrates a high-level data structure for an exemplary simulation data file according to one embodiment.

FIG. 4A illustrates a high-level data structure for an exemplary simulation data file according to one embodiment. In the illustrated embodiment, the simulation data file 410 includes three columns: a timestamp, player inputs, and a system state. The time stamp may correspond to an actual time, a simulation time, or may simply be a sequential series of index values. In the illustrated embodiment, the time stamp corresponds to a simulation time. The time stamp includes a reference following the seconds field to designate sub-second states. In one embodiment, the state of the system is recorded 60 times per second. At various points in time, a player input may be recorded. As illustrated in simulation data file 410, "Input A" is recorded at time "00:00:00.01," no player input is recorded at time "00:00:00.02," and "Input B" is recorded at time "00:00:00.03." Players inputs recorded in the simulation data file 410 may include inputs from a keyboard, a mouse, a motion sensor, a microphone, and the like. Corresponding to each timestamp is a system state. Information about the system state may include information about the players, information about the objects within the simulation, the states of the certain functions within the simulation, and the like. At step 420 simulation A is regenerated, leading to the creation of three additional simulation data files 430, 440, 450. As illustrated, each regenerated simulation data file 430, 440, 450 includes the entirety of simulation data file 410. Duplicating the simulation data file 410 in the regenerated data files 430, 440, 450 may allow simulation data files to be exchanged with another simulation system.

Following the duplicated data from simulation data file 410, is new simulation data that is unique to each of simulation data files 430, 440, and 450. As part of regeneration 420, the simulation data file 410 may be copied and renamed, such that both the original simulation data file 410 and the regenerated data files 430, 440, 450 may all be retained. As illustrated, simulation data file 430 shows the final system state is "State 9," while simulation data file 440 shows the final system state is "State 12," while simulation data file 450 shows the final system state is "State 15." The point at which the regenerated simulation data files diverge (i.e. when the system state is "State 6") may correspond to an important event in the simulation. Accordingly, each time the simulation is regenerated, it is regenerated at this particular time. Regeneration of simulations in this way allows players to replay a simulation from a middle to an unlimited number of different endings depending on the different decisions made in an open ended simulation. Further, by maintaining all of the simulation data files 410, 430, 440, 450, a player may later review each data file and assess the impact of different choices in the result of each simulation. Regenerated simulations may be started at a different point in time. For example, regenerated simulation D, need not necessarily start at time stamp 01:05:00.03. Rather, regenerated simulation D, may start at 01:05:00.01, or any other point in time.

Figure 4B:
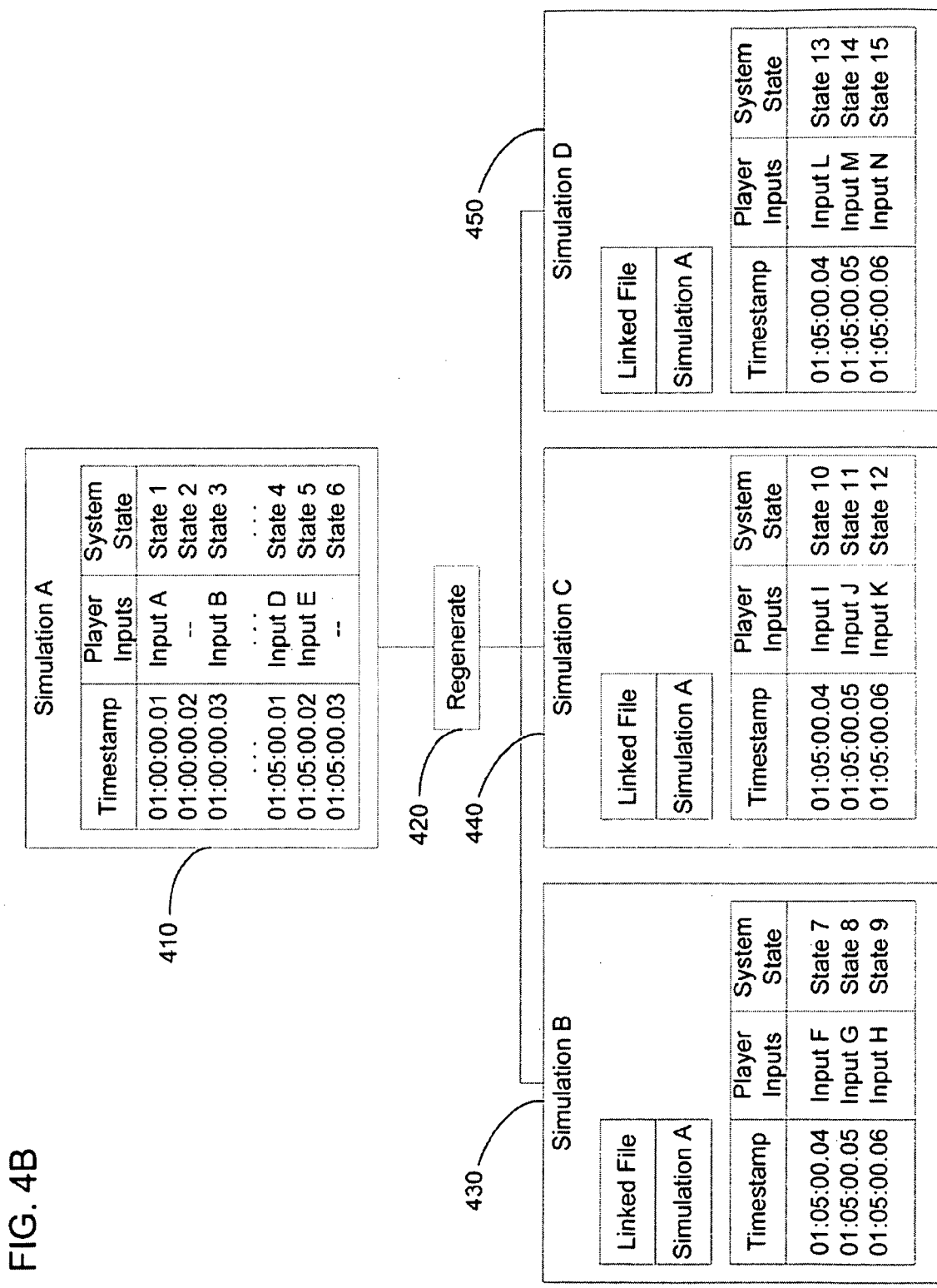
FIG. 4B illustrates an alternate data structure for an exemplary simulation data file in which files are linked according to one embodiment.

FIG. 4B illustrates an alternate data structure for an exemplary simulation data file in which files are linked according to one embodiment. As discussed in regard to FIG. 4A, a simulation data file 410 is regenerated into three additional simulation data files 430, 440, 450. In contrast to the embodiment shown in FIG. 4A, the entirety of simulation data file 410 is not duplicated in simulation data files 430, 440, and 450. Instead, the regenerated data files, 430, 440, and 450 include a link to simulation data file 410. The link may be implemented as a pointer, a file name, a memory location, a URL, or the like.

In this way, each of the regenerated simulation data files 430, 440, 450 may include all of the simulation information, but the simulation data files may be more compact; however, because the simulation data is divided among different simulation data files (e.g. simulation data file 410 and simulation data file 450), the resulting simulation data may be more difficult to transfer to another simulation system.

The illustrated data structure may exist as a discrete computer file that may be transferred to another system. Similarly, a simulation data file may be received from another system and reviewed in an AAR mode and/or regenerated. The simulation data files can be stored and loaded from external sources as well as internal (system) memory. The simulation data files are not tied to the system on which they were created. In certain embodiments, the simulation data files may be formatted such that they are transferrable between a variety of simulation systems. Data from any simulation data file can be loaded into the game engine and replayed in an AAR mode. Further, variations in the data structures shown in FIGS. 4A and 4B are contemplated, including, additional data fields, alternative time stamping conventions, and the like.

Figure 5:
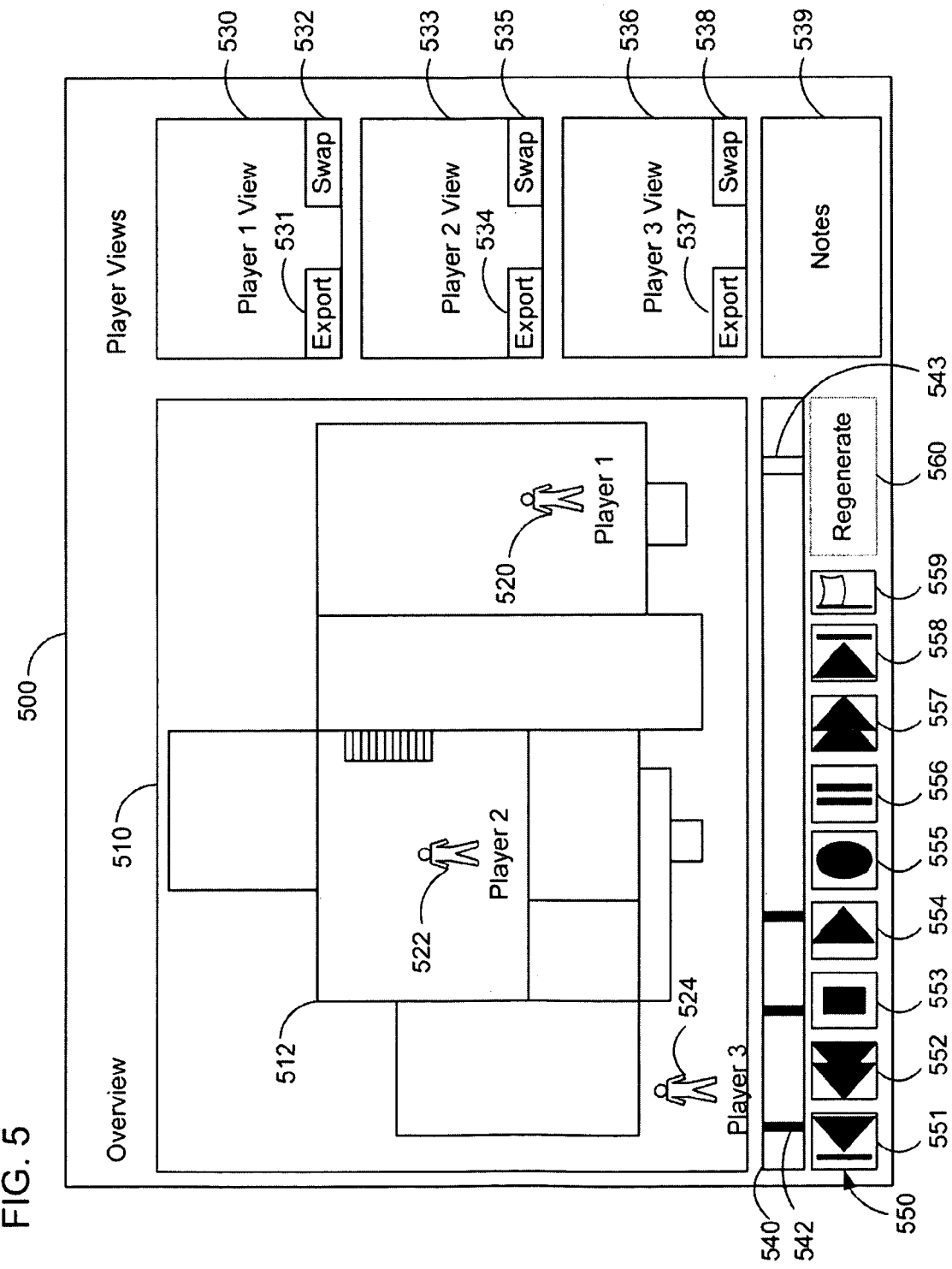
FIG. 5 is a screen shot of one embodiment of a facilitator view.

FIG. 5 is a screen shot of one embodiment of a facilitator view 500. The facilitator and the AAR mode described above assist players in practice or improvement of the skills utilized in the simulation. The facilitator view 500 may includes an overview 510 of the simulation. Each player 520, 522, 524 may be represented in the overview 510 as an icon showing the player's position. Of course, more than three players, or fewer than three players may be part of simulation. In the illustrated overview 510, player 1 520 and player 2 522 are shown within a house 512. The perspective view of each of the players may also be shown in individual player views 530, 533, 536. The individual player views 530, 533, 536 may each include the option to export 531, 534, 537, one player's view to another player, or to swap 532, 535, 538 one player's view with another player's view. Exporting or swapping a view may occur during a simulation or during the AAR mode. Further, the facilitator may swap a particular players view into the larger overview view 510 in order to view the simulation in greater detail from a particular player's perspective.

The facilitator view may include a scrubber bar 540 for quickly moving through the simulation during an AAR mode. A time indicator 543 may be dragged along the scrubber bar 540 in order to move forward or backward within the simulation. The scrubber bar may show one or more flagged events 542 corresponding to a time flagged by the facilitator. Flags may be added during a simulation or during the AAR mode by the facilitator using a flag button 559. The facilitator may also add notes regarding the flagged event using a notes box 539. Events may be flagged to facilitate locating and discussing a particular event during the AAR mode. As with other player input, the facilitator's notes and flags may be stored in a simulation data file.

The facilitator view 500 may include a plurality of controls 550 that may be utilized to control the simulation and the review of the simulation in the AAR mode. The plurality of controls 550 may include a skip to the beginning button 551, a rewind button 552, a stop button 553, a play button 554, a record button 555, a pause button 556, a fast forward button 557, and a skip to the end button 558. The record button 555 and the stop button 553 may be utilized to start a simulation and to stop a simulation. In some embodiments, the pause button may be pressed during a simulation to temporarily interrupt the simulation. When the stop button 553 is pressed during a simulation, the system may enter the AAR mode. When the stop button 553 is pressed during the AAR mode, the system may exit the AAR mode. In certain embodiments, the system may also exit the AAR mode when a regenerate button 560 is pressed.

In the AAR mode, the facilitator may utilize the scrubber bar 540 and the plurality of controls 550 to control the review of the simulation. The ability to control the playback of the simulation utilizing the plurality of controls 550 along with seeing the overall view plus any view of any particular player, allows for greater effectiveness and efficiency during the AAR. During the AAR the players may review what happened during the simulation and determine what may be done to improve the result of the simulation. During AAR the facilitator view 500 may be viewed by each participant.

At the conclusion of the AAR, the facilitator may use the regenerate button 560 to regenerate the simulation and allow the players to return to the simulations and implement various strategies for improving the result of the simulation. The process of AAR and regeneration may occur repeatedly, thus allowing players to practice their responses in a particular simulation. In one embodiment, as part of the regeneration, the facilitator may be prompted to add or remove elements during regeneration.

Figure 6:
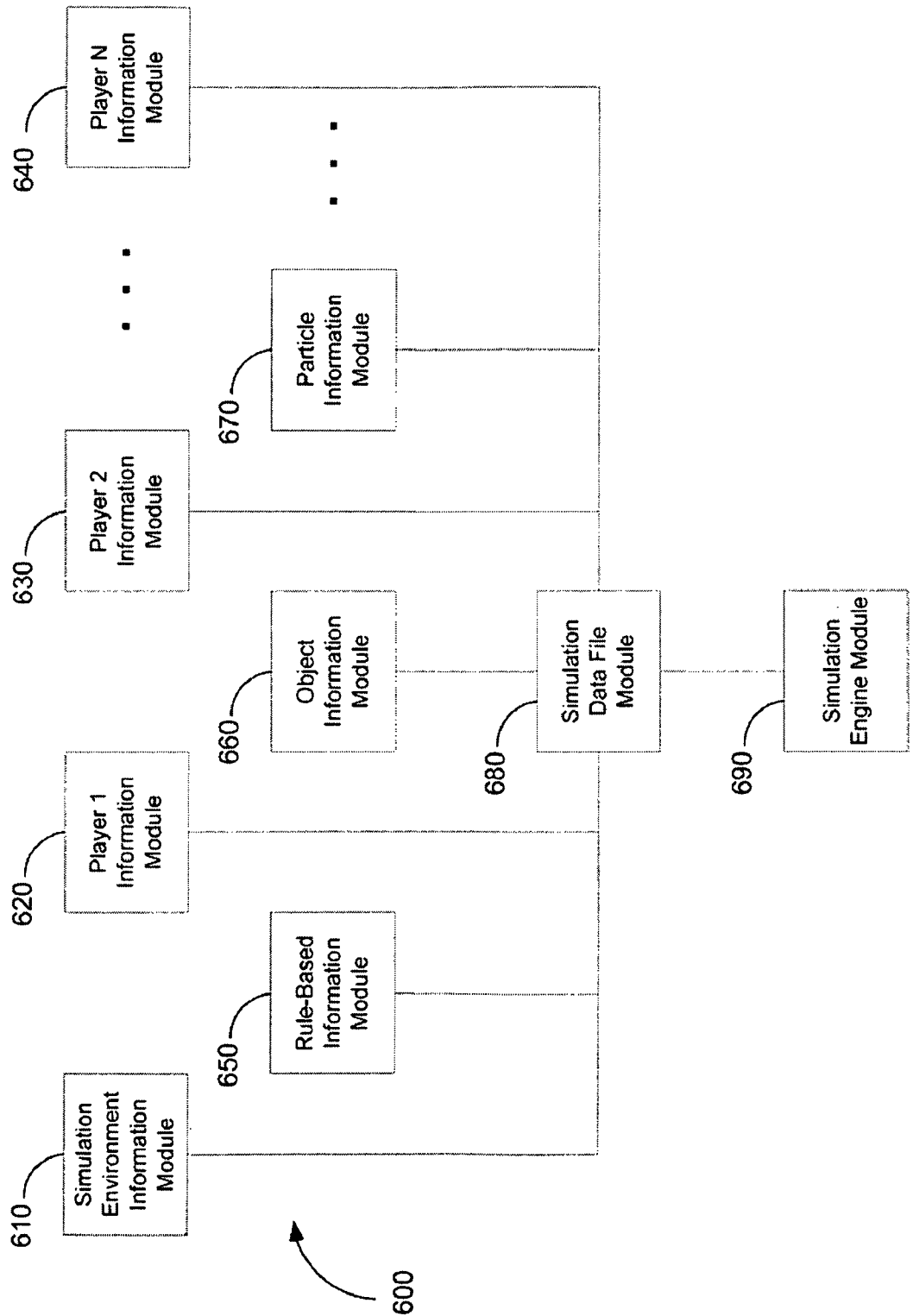
FIG. 6 illustrates a high-level data structure for an exemplary simulation data file according to one embodiment.

FIG. 6 illustrates a high-level data structure 600 for an exemplary simulation data file according to one embodiment. In the data structure 600 various components of the simulation data may be stored in a plurality of separate information modules. In the illustrated example, simulation environment information module 610 may be stored separately from rulebased information module 650. Similarly, player 1 information module 620 and player 2 information module 630 may be stored separately. A separate module may be created for any number of players (represented as player N information module 640). In various embodiments, the various modules containing simulation information may be separate files, separate locations in memory, or separate locations within a single file. FIG. 6 is merely one example of how various modules may be organized. In other embodiments, more or fewer modules may be included.

All of the simulation data contained in the various modules may be tied together by the simulation data file module 680. In certain embodiments, simulation data file module 680 may create a simulation data file that includes a link to each piece of data. An indexing value may be used to sequence the various pieces of data instead of the time stamp discussed in connection with FIGS. 4A and 4B. The links within the simulation data file may be implemented as a pointer, a file name, a memory location, a URL, or the like.

Managing simulation information as in separate modules, as illustrated in FIG. 6, may facilitate altering a simulation during an AAR mode or creating a regenerated simulation. For example, a first simulation may be recorded using five players. The simulation may be reviewed any number of times in an AAR mode. In the AAR mode, the facilitator may selectively ignore information for players 4 and 5 during playback. Nothing needs to be changed in the simulation data, but playback may be modified by ignoring certain information modules. Similarly, when a simulation is regenerated, information from various modules may be excluded from the regenerated simulation. Continuing the example, the same simulation may be regenerated into a new simulation having only three players, instead of the five players in the original simulation. Similarly, a new information module may be added in connection with a new player, a new object, or a new particle in the simulation.

It will be apparent to those having skill in the art that many changes may be made to the details of the above-described embodiments without departing from the underlying principles of the disclosure. The scope of the disclosure and embodiments discussed herein should, therefore, be determined only by the following claims.

The invention claimed is:

1. A simulation system comprising:
a plurality of player consoles configured to allow a plurality of players to provide input to the simulation system and display input received from the simulation system;
a facilitator console configured to allow a facilitator to provide input to the simulation system and display input received from the simulation system;
a network connection to interconnect the plurality of player consoles and the facilitator console;
a server connected to the network, the server comprising:
a processor in communication with the network connection;
a non-transitory computer readable storage medium in communication with the processor and the network connection, the computer readable storage medium comprising:
a simulation engine module executable on the processor, the simulation engine module operable to receive input from the plurality of player consoles and the facilitator console, and to generate a first simulation environment, the simulation engine module having a state corresponding to the state of the first simulation environment;
a simulation data file module executable on the processor, the simulation data file module operable to read out to a first simulation data file the state of the simulation engine module, the input from the player consoles, and the input from the facilitator console;
a video rendering module executable on the processor, the video rendering module operable to generate a representation of the first simulation environment that is displayable on the plurality of player consoles and the facilitator console; and
a regeneration module executable on the processor, the regeneration module operable to regenerate a second simulation at a regeneration point based on the first simulation data file corresponding to the regeneration point; and wherein the regeneration module causes the simulation data file module to read out to a second simulation data file the state of the simulation engine module, the input from the player consoles, and the input from the facilitator console; and
a facilitator module executable on the processor, the facilitator module configured to change the instances of objects or events during the simulation based on input received from the facilitator console.

2. The simulation system of claim 1, wherein the simulation engine module generates a three dimensional and open ended simulation environment.

3. The simulation system of claim 1, wherein the first simulation data file is transferrable to a second simulation system.

4. The simulation system of claim 1, wherein the non-transitory computer readable storage medium further comprises:
an after action review module executable on the processor, the after action review module operable to read into the simulation engine module the state of the simulation engine module and the input received from the plurality of players at a review time from the first simulation data file, and is operable to cause the video rendering module to generate a representation of the simulation environment that is displayable on the plurality of player consoles and the facilitator console at the review time.

5. The simulation system of claim 1, wherein the facilitator module is operable to create a flagged point during the first simulation based on input from the facilitator console, and the facilitator module is operable to cause the video rendering module to generate a representation of the simulation environment that is displayable on the plurality of player consoles and the facilitator console at the flagged point.

6. The simulation system of claim 5, wherein the flagged point corresponds to the regeneration point.

7. The simulation system of claim 1, wherein the second simulation data file comprises the first simulation data file.

8. The simulation system of claim 1, wherein the second simulation data file comprises a link to the first simulation data file.

9. The simulation system of claim 1, wherein the simulation data file module reads out simulation data to a plurality of information modules.

10. The simulation system of claim 1, wherein the regeneration point may be selected from any point in the first simulation data file.

11. The simulation system of claim 1, wherein the regeneration module is operable to regenerate a plurality of simulations at a plurality of regeneration points; and wherein the regeneration module causes the simulation data file module to read out to a plurality of simulation data files the state of the simulation engine module and the input from the player consoles.

12. A method of recording and regenerating a simulation, the method comprising:
  initiating a first simulation including a plurality of player consoles and a facilitator console;
  receiving input from the plurality of player consoles and the facilitator console;
  recording the first simulation by reading out a system state of a simulation engine and the input received from the plurality of player consoles and the facilitator console to a first simulation data file at a plurality of different times;
  changing the instances of objects or events in the first simulation data file based on input received from the facilitator console;
  regenerating the simulation at a regeneration point based on the first simulation data file corresponding to the regeneration point;
  initiating a second simulation including the plurality of player consoles and the facilitator console; and
  reading out the state of the simulation engine to a second simulation data file during the second simulation following the regeneration point.

13. The method of claim 12, wherein the simulation engine generates a three dimensional and open ended simulation.

14. The method of claim 12, further comprising:
  entering an after action review mode;
  reading into the simulation engine the state of the simulation engine and the input received from the plurality of player consoles and the facilitator console from the first simulation data file at a plurality of different times; and
  displaying the recorded simulation to the plurality of player consoles and the facilitator console at the plurality of different times based on the first simulation data file.

15. The method of claim 14, further comprising:
  creating a flagged point during the first simulation based on input from the facilitator console; and
  displaying the simulation during the after action review at the flagged point based on the first simulation data file corresponding to the flagged point.

16. The method of claim 15, wherein the flagged point corresponds to the regeneration point.

17. The method of claim 15, further comprising:
  displaying an overview to the facilitator console during the first simulation showing a position of each of a plurality of players within the simulation.

18. The method of claim 15, further comprising:
  displaying a perspective view of each of a plurality of players to the facilitator during the first simulation.

19. The method of claim 12, wherein the second simulation data file comprises the first simulation data file.

20. The method of claim 12, wherein the second simulation data file comprises a link to the first simulation data file.

21. The method of claim 12, wherein the input from the plurality of player consoles includes audio data, and wherein the audio data is stored in the first simulation data file.

22. A simulation system comprising:
  means for initiating a first simulation including a plurality of player consoles and a facilitator console;
  means for receiving input from the plurality of player consoles and the facilitator console;
  means for changing the instances of objects or events during the simulation based on input received from the facilitator console;
  means for recording the simulation by reading out a state of a simulation engine and the input received from the plurality of player consoles and the facilitator console to a first simulation data file at a plurality of different times;
  means for regenerating the simulation at a regeneration point based on the first simulation data file corresponding to the regeneration point;
  means for initiating a second simulation including the plurality of player consoles, the facilitator console, and the state of the simulation engine; and
  means for reading out the state of the simulation engine to a second simulation data file during the second simulation following the regeneration point.

23. The simulation system of claim 22, further comprising:
  means for entering an after action review mode;
  means for reading into the simulation engine the state of the simulation engine and the input received from the plurality of player consoles and the facilitator console from the first simulation data file at a review time; and
  means for displaying the recorded simulation to the plurality of player consoles based on the first simulation data file.

* * * * *